United States Patent [19]
Colley

[11] Patent Number: 4,990,315
[45] Date of Patent: Feb. 5, 1991

[54] APPARATUS FOR DESULFURIZATION
[75] Inventor: James D. Colley, Austin, Tex.
[73] Assignee: Tampa Electric Company, Tampa, Fla.
[21] Appl. No.: 412,854
[22] Filed: Sep. 25, 1989

Related U.S. Application Data

[62] Division of Ser. No. 154,946, Feb. 10, 1988, Pat. No. 4,876,076.

[51] Int. Cl.[5] .............................................. B01D 53/14
[52] U.S. Cl. ..................................... 422/170; 422/234
[58] Field of Search ............... 422/170, 172, 168, 169, 422/234; 423/242 A, 242 R, 320, 555

[56] References Cited

U.S. PATENT DOCUMENTS

| | | | |
|---|---|---|---|
| 4,351,804 | 9/1982 | Biedell et al. | 422/170 |
| 4,533,522 | 8/1985 | Leimkühler | 422/170 |
| 4,627,965 | 12/1986 | Hegemann et al. | 423/555 |
| 4,632,810 | 12/1986 | Schinoda et al. | 423/555 |
| 4,719,088 | 1/1988 | Itoh et al. | 422/170 |
| 4,832,936 | 5/1989 | Holter et al. | 423/555 |
| 4,842,835 | 6/1989 | Dörr et al. | 423/242 |
| 4,853,195 | 8/1989 | Lehto | 423/242 |

Primary Examiner—Robert J. Warden
Assistant Examiner—D. John Griffith, Jr.
Attorney, Agent, or Firm—Klauber & Jackson

[57] ABSTRACT

In the desulfurization of flue gas utilizing limestone as absorbent in a double loop system, in which the flue gas is introduced into a quenching zone for contact with a first slurry of the limestone, and thereafter passes to an absorbing zone for further contact with a second limestone slurry, the two slurries being supplied from a mixing zone into which water and limestone are charged, and in which air is introduced into the quenching zone to convert the calcium sulfite present in it to gypsum, air is also supplied to the mixing zone to convert calcium sulfite in it to gypsum, and limestone is directly added to the quenching zone.

3 Claims, 2 Drawing Sheets

APPARATUS FOR DESULFURIZATION

This is a division of application Ser. No. 154,946, filed Feb. 10, 1988, now U.S. Pat. No. 4,867,076.

FIELD OF THE INVENTION

This invention relates to desulfurization and is more particularly concerned with desulfurization in the presence of limestone wherein gypsum is recovered as a by-product.

BACKGROUND OF THE INVENTION

Air pollution is a very serious and urgent international problem. The sources of air pollution are primarily the products of combustion and are numerous and widespread.

Many of the air pollutants are in the form of sulfur-bearing flue gases discharged by fossil-fuel-burning electrical power generating plants or other industries. While the precise impact of these pollutants on the environment is still a subject of speculation, there nonetheless is considered to be a possible negative effect. Yet, under foreseeable circumstances, it will be necessary to burn more and more fuel to meet the demands of a rapidly growing population requiring for each person evermore heating comfort and power, and the fuel which will generally be used will not contain much less sulfur, but will likely contain more sulfur.

Thus, sulfur oxides, principally present as sulfur dioxide, are found in the waste gases discharged from many metal refining and chemical plants, and in the flue gases from power plants generating electricity by the combustion of fossil fuels. In addition, sulfur-containing gases, notably sulfur dioxide, may be formed in the partial combustion or gasification of sulfur-containing fuels, such as coal or petroleum residua. The control of air pollution resulting from the discharge of sulfur dioxide into the atmosphere has thus become increasingly urgent.

The most common flue gas desulfurization (FGD) process is known as the "wet process". In that process the sulfur dioxide-containing flue gas is scrubbed with a slurry containing, e.g., limestone. The scrubbing takes place, for example, in an absorption tower in which the gas flow is countercurrent to and in intimate contact with a stream of slurry. The slurry may flow over packing or trays, or be sprayed into an open section of the tower. The spent slurry product of this FGD process contains both calcium sulfite and calcium sulfate. It has been found to be advantageous to convert the calcium sulfite in the product to calcium sulfate by bubbling air or other oxygencontaining gas through the slurry.

Gypsum has many advantages, such that it is much in demand, essentially harmless, incombustible, and chemically stable, and it can be disposed of as waste material in land reclamation without the danger of secondary public nuisance. Moreover, limestone can be used as a neutralizing agent in desulfurization with gypsum as a by-product. The former is not only exceptionally cheap as compared with other neutralizing agents, but it is also readily available in a relatively long-lasting stable form.

One system for the desulfurization of flue gases by means of a limestone-containing scrubbing liquid involves a double loop or circuit for the liquid streams being employed, such as shown in Biedell et al, U.S. Pat. No. 4,351,804. In that system, the gas to be treated first enters a "quencher" and then passes to an "absorber", and the two liquid loops or circuits are each connected to one of these two units and to each other. A slurry containing limestone and gypsum solids fed to the quencher is contacted with the flue gas being treated and, after contact, accumulates at the bottom of the quencher, and air is introduced into the liquid accumulated in the quencher to oxidize the calcium sulfite which has been formed from the reaction between $SO_2$ and limestone, to calcium sulfate (gypsum).

Limestone is fed to the absorber feed tank from which a slurry containing limestone, calcium sulfite and calcium sulfate is fed to the absorber for contact with the flue gas. This slurry is recirculated to the feed tank. A portion of the slurry in the absorber feed tank overflows to the quencher and a portion is sent to a set of hydroclones. The hydroclones separate the solids from the liquid in the slurry and the concentrated solids are discharged directly to the quencher. The dilute stream from the hydroclones is returned to the absorber feed tank. The purpose of this step is to control the suspended solids concentration in the absorber feed tank slurry.

Objectives of a forced oxidized limestone desulfurization process are to maximize the purity of the gypsum produced since the commercial attractiveness of the gypsum is a function of its purity, and to produce a low degree of sulfur gas (expressed as $SO_2$) in the flue gas effluent at a reasonable gas flow.

While the above-mentioned double loop system for desulfurization utilizing limestone as a reagent is generally effective, difficulty has been experienced in meeting the stated objectives of a high degree of desulfurization with simultaneous production of gypsum of high purity. Difficulty has also been experienced by reason of gypsum scale formation in the treating apparatus associated with the absorber. The chemical scale which grows on the absorber packing eventually accumulates until it obstructs the normal path of the flue gas through the absorber. At that time, costly maintenance must be performed on the absorber to remove the scale.

OBJECTS OF THE INVENTION

It is, accordingly, an object of this invention to provide an improved process for flue gas desulfurization.

It is another object of the invention to provide an improved wet process for desulfurization utilizing limestone as a reagent.

It is a further object of the invention to provide an improved desulfurization process which will product high quality gypsum as a by-produce.

It is a still further object of the invention to provide an improved desulfurization process wherein scaling and deposition of solids within the absorber packing are suppressed.

SUMMARY OF THE INVENTION

These and other objects are achieved in accordance with the invention by effecting, in a double loop desulfurization system employing limestone as a reagent, oxidation of sulfite to sulfate not only in the quencher but in the absorber feed tank (AFT) as well, and by the direct addition of limestone to the quencher as well as the absorber feed tank.

BRIEF DESCRIPTION OF THE DRAWINGS

The invention will now be described in more detail by reference to the accompanying drawings, wherein.

DESCRIPTION OF THE PREFERRED EMBODIMENTS

Figure 1:
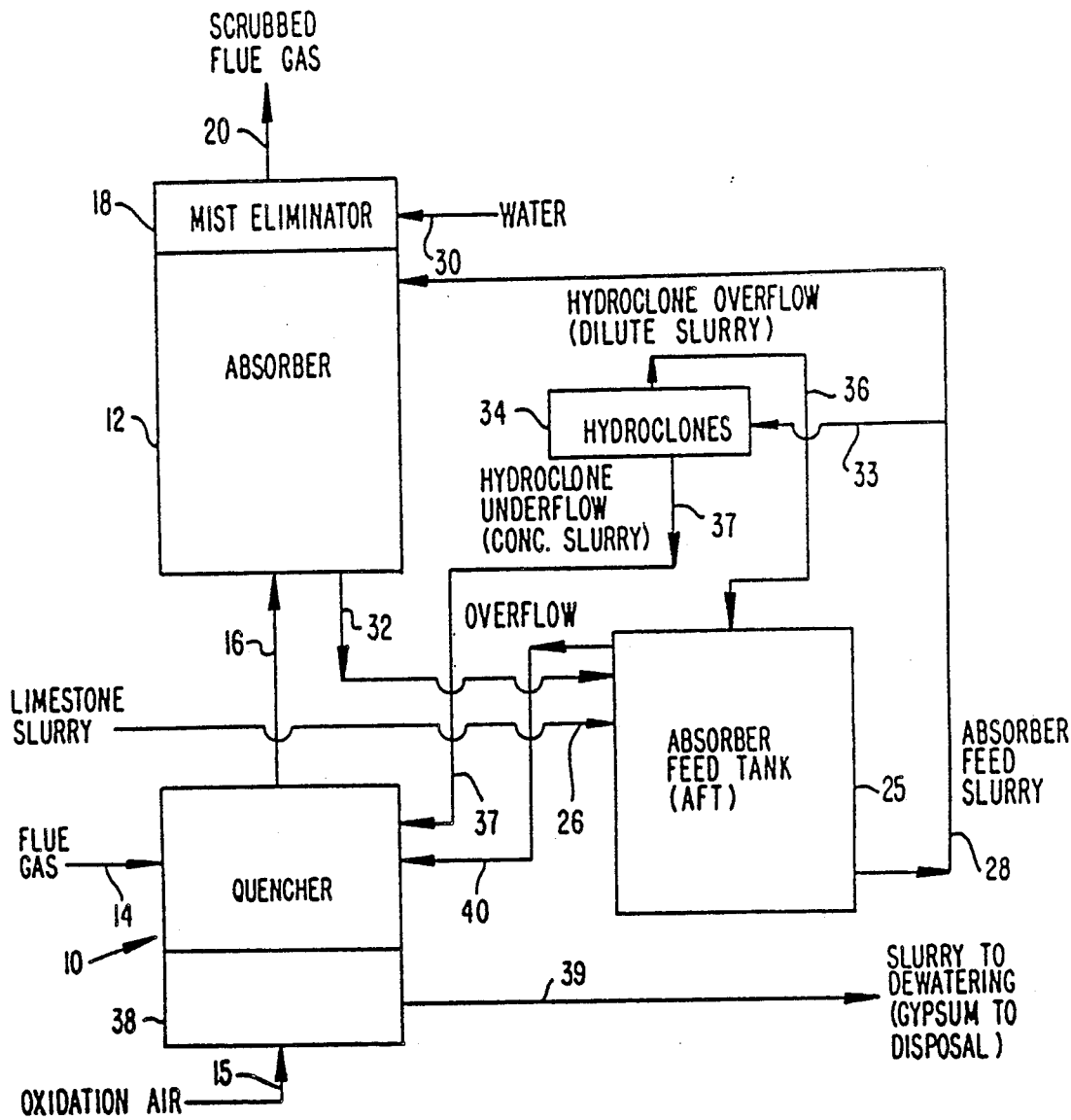
FIG. 1 is a diagrammatic flow sheet of the pertinent portion of the prior art double loop desulfurization system.

Referring now to the drawings, and particularly to FIG. 1, the prior double loop desulfurization system illustrated embodies a quencher 10, and an absorber 12. The flue gas to be treated is fed to quencher 10 through line 14 and in the quencher 10 it is brought into contact with quenching liquid comprising a slurry of limestone and calcium sulfate, which is advantageously distributed through headers (not shown) and the slurry after distribution and contact with the flue gas accumulates in the bottom (sump) of quencher 10, suitably provided with an agitator (not shown).

In the quencher 10, contact of the limestone ($CaCO_3$) with the sulfur gases ($SO_2$) that were absorbed from the flue gas and that are now present in the liquid phase of the slurry as dissolved sulfite species, produces calcium sulfite. The calcium sulfite still in the liquid is converted to calcium sulfate (gypsum) by air oxidation. A line 15 is provided for the introduction of air into the accumulated slurry in the quencher sump for this purpose. In addition, calcium sulfite enters the quencher from the absorber feed tank via lines 37 and 40. This is because most of the $SO_2$ removed from the flue gas is done so in the absorber section. Most of this absorbed $SO_2$ precipitates as solid calcium sulfite in the absorber feed tank with a smaller fraction being naturally oxidized by the oxygen in the flue gas to produce calcium sulfate which also precipitates in the absorber feed tank. Therefore, since the purpose of the oxidation step in the quencher is to convert all sulfite to sulfate, and since the reaction between oxygen and sulfite occurs in the liquid phase only, this calcium sulfite must dissolve first, react with oxygen from the air introduced into the quencher, then precipitate as calcium sulfate.

The sulfite dissolution rate is slow at slurry pHs above about 5.0; therefore, the quencher must operate at a pH of at most 5.0 to promote good conversion of sulfite to sulfate within the relatively short amount of time available in the quencher. As indicated below, the pH in the quencher is maintained at 4.5 to 5.

The flue gas treated in quencher 10 then flows upwardly (line 16) through a separator which isolates the quencher slurry from the absorber feed tank slurry to absorber 12, where the remainder of the $SO_2$ removal from the flue gas occurs. This is accomplished by contacting the flue gas with a slurry containing limestone, calcium sulfite and calcium sulfate in a slurry-spray section of the absorber similar to that used in the quencher. Immediately above this spray section, the flue gas enters the "packed section" of the absorber which contains a corrugated-type plastic fill material which promotes good contacting between absorber feed tank slurry, a stream of which is continuously sprayed onto the packing, and the flue gas. The improved contacting of the gas and slurry increases the $SO_2$ removed from the flue gas. After the packing section, the flue gas passes through a mist eliminator 18 and eventually leaves the system through outlet line 20.

In the drawings, the systems for supplying and removing fluids from the quencher and absorber are shown in abbreviated fashion in order to facilitate the description of the invention and its relationship to the prior art. Thus, referring again to FIG. 1, the main component of the fluid-flow loops is the absorber feed tank 25 into which the desulfurization reagent, limestone, is fed. The limestone is supplied to tank 25 to form an aqueous slurry in the feed tank 25 via line 26 wherein it is mixed with the calcium sulfite and calcium sulfate solids formed from the reaction of $SO_2$ and limestone. The slurry leaves absorber feed tank 25 via line 28 which leads to absorber 12 which contains headers (not shown) for distribution of the slurry both in the spray section and in the packed section for contact with the flue gas passing through absorber 12.

Before eventually leaving the absorber through outlet line 20, the gas passes through mist eliminator 18, which may comprise one or more units, and mist eliminator 18 is supplied with wash water entering through line 30 to clean it of solids which accumulate on its surfaces. A line 32 carries spent absorber feed slurry from the absorber tower, after contact with the flue gas, back to the absorber feed tank.

Returning to the absorber tank circuit or loop, some of the slurry in line 28 is diverted into line 33 and this line 33 carries the diverted slurry (typically 10% solids by weight) to one or more hydroclones 34 which separate by centrifugal forces the liquid phase from the solid phase of the slurry, resulting in an overflow dilute slurry (typically 6% solids by weight) and an underflow concentrated slurry (typically 30% solids by weight). The overflow dilute slurry is returned to the absorber feed tank 25 via line 36 and the underflow concentrated slurry is supplied to the quencher 10 via line 37 for desulfurizing contact with the flue gas. Most of the limestone for reaction with the $SO_2$ removed in the quencher section is contained in this stream. The purpose of the hydroclones is to provide a means to control the solids concentration of the absorber feed slurry. By removing a high suspended solids concentration stream from the slurry in the absorber feed tank, the building of solids in this tank can be controlled.

A smaller amount of limestone enters the quencher from an overflow line on the absorber feed tank. This line maintains the absorber feed tank at a constant level by gravity draining slurry from the top of the tank when the level reaches this point. The material balance around this tank is such that water and solids continuously accumulate in this tank and thus some slurry is always overflowing to the quencher via line 40 since the volume leaving the tank via line 37 is less than the amount fed to the tank. The accumulated liquid 38 in the sump of quencher 10 is removed from the quencher sump via line 39 and is subsequently dewatered to recover the gypsum which has been formed.

Calcium sulfite solids are present in the absorber feed tank 25 as a result of the flow through line 32 leading from the absorber 12 where contact between the sulfur oxide in the flue gas and the limestone has occurred. It also typically contains some calcium sulfate solids which are formed in the absorber 12 by reaction of oxygen in the flue gas with the calcium sulfite formed as the limestone in the slurry entering through line 28 reacts with the sulfur gases in the flue gas and is contained in the flow to the absorber feed tank 25 via line 32.

In accordance with this invention basic improvements are made in the above-described desulfurization system and process, which bring about surprising and unexpected results in terms of increased desulfurization, the production of gypsum of high purity, and the simultaneous suppression of chemical scaling problems in the absorber.

Figure 2:
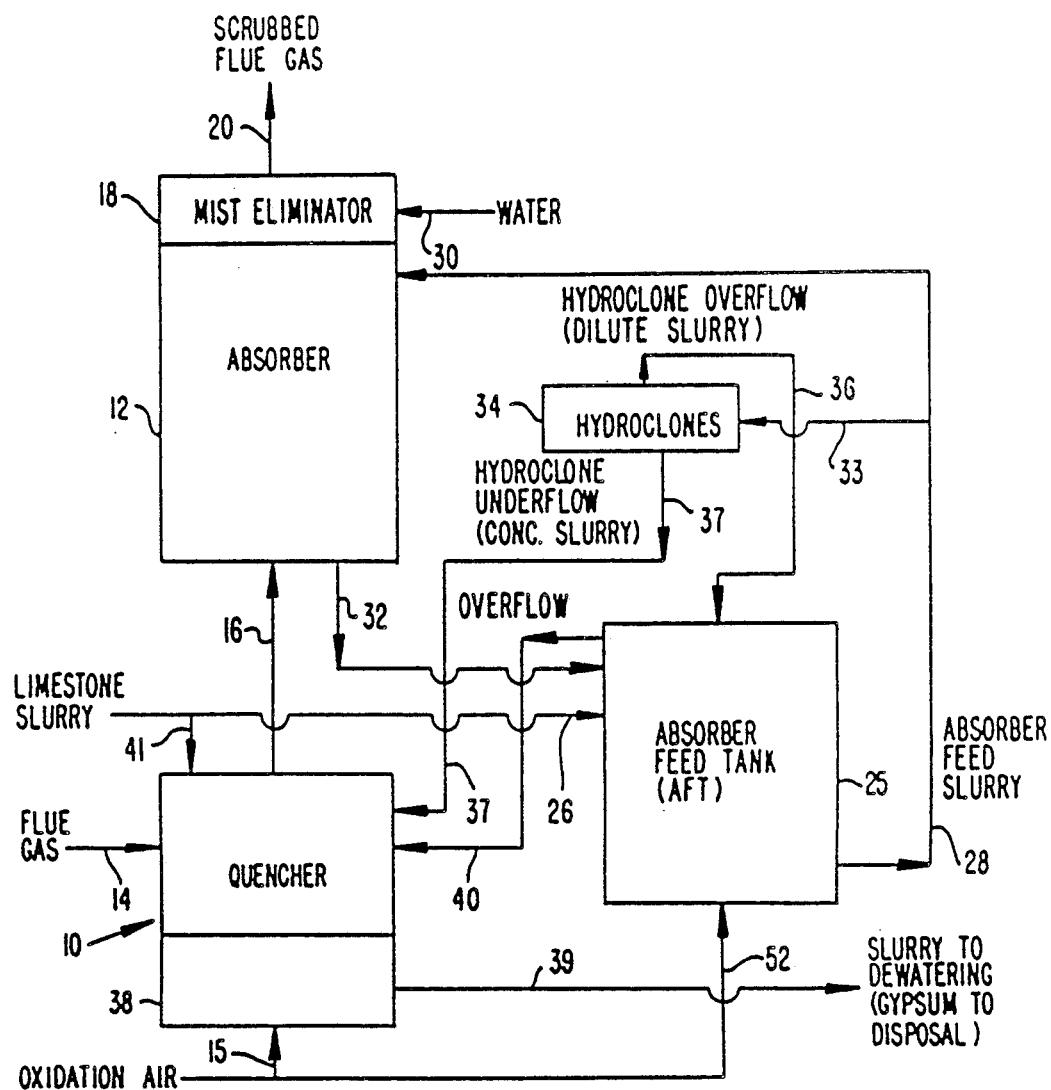
FIG. 2 is a similar flow sheet of this portion of the double loop desulfurization system, embodying features of the present invention.

Thus, referring now to FIG. 2, the system shown in FIG. 1 is reproduced, but line 26, through which a slurry of limestone is supplied to absorber feed tank 25, is provided with a branch or diversion line 41 through which limestone is fed directly to the quencher. It has been discovered, through extended operating experience with the prior art, that periodically the amount of limestone fed to the quencher was inadequate to react with the amount of $SO_2$ absorbed in this part of the absorber. The reason for the inadequate feed of limestone to the quencher is due to the indirect method of feed limestone to the quencher. In the prior art, limestone must first pass through the absorber feed tank before it reaches the quencher. The volume of the absorber feed tank is very large relative to the volume of limestone fed to this tank. It therefore takes an inordinate amount of time for a change in the limestone feed rate to the absorber feed tank to result in a change in the amount of limestone being fed to the quencher.

When the amount of limestone fed to the quencher is too low to react with the absorbed $SO_2$, the pH of the quencher slurry declines. This drop of pH results in a reduction in the $SO_2$ removal efficiency of the quencher and an overall drop in the absorber $SO_2$ removal efficiency until the pH can be raised. By feeding limestone directly to the quencher, the pH of the quencher slurry can be more closely regulated and the low pH excursions avoided. As a result, the time average $SO_2$ removal of the absorber is increased. For proper operation, therefore, the pH in the quencher is maintained at 4.5 to 5.

In addition, air for oxidizing sulfite to sulfate is introduced not only into the quencher 10 through line 15, but air is also introduced into absorber feed tank 25 through line 52 for contact with the slurry in this tank. Typically such air is introduced beneath the slurry surface through sparging headers.

It has been surprisingly discovered that, in accordance with the invention, conversion of the sulfite to sulfate in the absorber feed tank 25 by reason of the introduction of air through line 52 results in the presence in the slurry of a much larger crystal—the calcium sulfate dihydrate crystal compared to the calcium sulfite hemihydrate crystal. Complete conversion of sulfite to sulfate has been demonstrated through extensive testing. The particle size of the calcium sulfate is as large and larger than that of the limestone in the absorber feed tank 25. As a result, the calcium sulfate has more of a tendency to exit the underflow of the absorber feed tank hydroclones 34. This reduces uncontrolled quantities of limestone being fed to the quencher 10 through line 37 and, in effect, "short-circuiting to" the quencher through the hydroclones 34, which has led to too high a pH in the quencher for good sulfite oxidation and limestone utilization, causing a reduction in gypsum quality.

Table 1 shows a comparison of particle size measurements made on the absorber feed tank (AFT) sulfur solids, the AFT hydroclone overflow sulfur solids and the AFT hydroclone underflow sulfur solids. The results show a significant increase in the average particle diameter of the sulfur solids due to oxidation. The prior art AFT sulfur solids average 24 microns in diameter, whereas the improved process AFT sulfur solids average about 40 microns. This compares to the average particle diameter of the limestone in the AFT of about 20 microns if a "fine" limestone is fed (nominally 90 percent of the limestone less than 74 microns). When a coarse limestone (70 percent less than 74 microns) is fed to the AFT, the average limestone particle diameter in the AFT has been measured to be 42 microns.

Analysis of the AFT solids indicates that essentially complete conversion of the calcium sulfite to calcium sulfate is accomplished by sparging the AFT with air. The difference in particle size for the AFT sulfur solids is due to the different shape of the calcium sulfite and calcium sulfate crystals. The beneficial effect that this has on the performance of the AFT hydroclones can be seen by examining Table 2, which presents the results of actual analyses from operating absorbers of the limestone in the streams into and out of the AFT hydroclones operating with and without oxidation in the AFT.

The limestone concentration in the AFT hydroclone underflow is significantly greater than that in the AFT slurry for the prior art system, both with a coarse and with a fine limestone fed to the AFT (330 percent and 200 percent greater, respectively). The limestone concentration in the AFT hydroclone underflow is virtually the same as that in the AFT slurry for the improved process, however, the effect of the particle size of the limestone fed to the AFT also is diminished. There is only a slight improvement in $CaCO_3$ magnification (defined as the ratio of $CaCO_3$ in the hydroclone underflow to the $CaCO_3$ in the AFT) in the case of fine limestone compared to the coarse limestone for the improved process. Therefore, slight variations in limestone particle size which often occur in these processes will have little effect on the overall performance of the FGD system. In fact, the improved process would allow satisfactory operation with coarse limestone which is significantly less costly to prepare than a fine limestone.

The direct and beneficial result of operation with less limestone in the AFT hydroclone underflow is that the quencher can be controlled at a pH which is beneficial for producing a high quality gypsum. Furthermore, this can be accomplished with the absorber operating at a high level of $SO_2$ removal efficiency. Table 3 presents the results of testing an absorber with and without AFT oxidation and direct feed of limestone to the quencher. The results show a dramatic increase in the quality of the product solids from the quencher, measured as the calcium sulfate dihydrate or gypsum fraction. Without AFT oxidation and direct feed of limestone to the quencher, the gypsum fraction in the product solids is 69 percent, which makes it unacceptable as a raw material for any further use, such as wallboard manufacture.

Moreover, in the prior art system, it has been found that the packing in the absorber 12 tends to become subject to scaling and plugging. It is believed that this has occurred as a result of the unwanted deposition of the gypsum which forms in the absorber due to the reaction of sulfite and the oxygen in the flue gas as discussed above. A surprising effect of the improvements of this invention is that, as a result of the conversion of sulfite to sulfate (gypsum) in the absorber feed tank 25 by the reason of the oxidation caused by the introduction of air in the tank, calcium sulfate becomes the predominate solid species in the slurry. The presence of the large amount of calcium sulfate crystal surface area provides numerous sites for precipitation of the calcium sulfate formed in the packing due to sulfite oxidation there. The gypsum thus formed preferentially grows on the existing gypsum crystals rather than on the surface of the packing. In any case, by operating in accordance with the invention, e.g., by providing precipitation sites for the calcium sulfate formed in the packing, the rate of scale formation and plugging is significantly reduced. The average number of operating days from the time an absorber tower is placed into service with new packing until the time it must be removed from service due to pluggage of the packing is about 55 days for the original design based on extensive operating experience. Oxidation in the absorber feed tank has allowed this period to be increased to at least 120 days, thereby reducing by more than 50 percent the amount of packing which would be considered on an annual basis.

While the present invention has been particularly set forth in terms of specific embodiments thereof, it will be understood in view of the instant disclosure, that numerous variations upon the invention yet reside within the scope of the present teaching. Accordingly the invention is to be broadly construed, and limited only by the scope and spirit of the claims now appended hereto.

TABLE 1

AVERAGE CRYSTAL DIAMETER FOR SULFUR SOLIDS IN AFT, AFT HYDROCLONE OVERFLOW AND AFT HYDROCLONE UNDERFLOW SLURRY

| | Average Particle Diameter, microns | | |
|---|---|---|---|
| | AFT | Hydroclone Overflow | Hydroclone Underflow |
| Prior Art | 24 | 21 | 30 |
| Improved Process | 40 | 25 | 49 |

TABLE 2

EFFECT OF AFT OXIDATION ON $CaCO_3$ MAGNIFICATION IN THE HYDROCLONE UNDERFLOW

| | AFT $CaCO_3$, Wt % | Hydroclone Underflow $CaCO_3$, Wt % | $CaCO_3$ Magnification in Hydroclone Underflow, % |
|---|---|---|---|
| Prior Art | | | |

TABLE 2-continued

EFFECT OF AFT OXIDATION ON $CaCO_3$ MAGNIFICATION IN THE HYDROCLONE UNDERFLOW

| | AFT $CaCO_3$, Wt % | Hydroclone Underflow $CaCO_3$, Wt % | $CaCO_3$ Magnification in Hydroclone Underflow, % |
|---|---|---|---|
| Coarse Limestone Fed to AFT | 9.3 | 31.0 | 330 |
| Fine Limestone Fed to AFT | 11.0 | 22.0 | 200 |
| Improved Process | | | |
| Coarse Limestone Fed to AFT | 15.5 | 17.0 | 110 |
| Fine Limestone | 16.2 | 14.6 | 90 |

TABLE 3

EFFECT OF AFT OXIDATION ON ABSORBER $SO_2$ REMOVAL EFFICIENCY AND PRODUCT GYPSUM PURITY

| | Absorber $SO_2$ Removal Efficiency, % | Gypsum Fraction In Product Solids, % $CaSO_4 \cdot 2H_2O$ |
|---|---|---|
| Prior Art | 95 | 69 |
| Improved Process | 94 | 94 |

I claim:

1. In a double-loop desulfurization system having a quencher for receipt of flue gas to be desulfurized, an absorber for receiving the gas after passage through said quencher, absorber feed means, means for introducing limestone into said absorber feed means, first conduit means for supplying limestone slurry to said quencher, means for introducing air into said quencher to convert the calcium sulfite therein to gypsum; second conduit means for supplying limestone slurry from said absorber feed means to said absorber; a solids-liquid separator connected to receive a portion of the limestone slurry in said second conduit means and to pass a solids-rich slurry to said first conduit means; and means for introducing air into said quencher; the improvement which comprises, means for introducing air into said absorber feed means for converting calcium sulfite therein to larger gypsum crystals for preferential separation into said solids-rich slurry.

2. A system as defined in claim 1, wherein said air is introduced into said absorber feed means by sparging headers which discharge the air beneath the slurry surface.

3. A system as defined in claim 1, further including means for directly adding limestone to said quencher.

* * * * *

UNITED STATES PATENT AND TRADEMARK OFFICE
CERTIFICATE OF CORRECTION

PATENT NO. : 4,990,315

DATED : February 5, 1991

INVENTOR(S) : James D. Colley

It is certified that error appears in the above-identified patent and that said Letters Patent is hereby corrected as shown below:

At column 1, line 53, change "oxygencontaining" to -- oxygen-containing --; line 63, change "tho" to -- the --.

At column 2, line 63, insert -- to -- at the end of the line.

At column 7, delete all of Table 2 that appears in that column.

At column 8, line 1, delete "-continued"; line 8, insert -- Prior Art -- above the words "Coarse Limestone".

Signed and Sealed this

Twenty-eighth Day of July, 1992

Attest:

DOUGLAS B. COMER

*Attesting Officer*  *Acting Commissioner of Patents and Trademarks*